United States Patent
Dittrich

(10) Patent No.: US 10,781,379 B2
(45) Date of Patent: Sep. 22, 2020

(54) PROCESS FOR CONVERTING LPG TO HIGHER HYDROCARBON(S)

(71) Applicant: SABIC Global Technologies B.V., Bergen op Zoom (NL)

(72) Inventor: Christoph Dittrich, Geleen (NL)

(73) Assignee: SABIC GLOBAL TECHNOLOGIES B.V., Bergen op Zoom (NL)

( * ) Notice: Subject to any disclaimer, the term of this patent is extended or adjusted under 35 U.S.C. 154(b) by 0 days.

(21) Appl. No.: 16/061,395

(22) PCT Filed: Dec. 6, 2016

(86) PCT No.: PCT/EP2016/079801
§ 371 (c)(1),
(2) Date: Jun. 12, 2018

(87) PCT Pub. No.: WO2017/102411
PCT Pub. Date: Jun. 22, 2017

(65) Prior Publication Data
US 2019/0040324 A1 Feb. 7, 2019

(30) Foreign Application Priority Data
Dec. 14, 2015 (EP) .................................. 15199876

(51) Int. Cl.
*C10G 45/68* (2006.01)
*B01J 8/04* (2006.01)
(Continued)

(52) U.S. Cl.
CPC ............ *C10G 45/68* (2013.01); *B01J 8/0457* (2013.01); *C10G 45/70* (2013.01); *C10G 65/046* (2013.01);
(Continued)

(58) Field of Classification Search
CPC ...................................................... C10G 45/68
(Continued)

(56) References Cited

U.S. PATENT DOCUMENTS

| | | | |
|---|---|---|---|
| 4,045,182 A | 8/1977 | Bonnell et al. | |
| 4,056,575 A | 11/1977 | Gregory et al. | |

(Continued)

FOREIGN PATENT DOCUMENTS

| | | | |
|---|---|---|---|
| CN | 101429452 B | 5/2009 | |
| CN | 102399589 A | 4/2012 | |

(Continued)

OTHER PUBLICATIONS

Encyclopaedia of Hydrocarbons, "Aromatics: Aromatics production and use", 2006, vol. II, Refining and Petrochemicals, Chapter 10.6, pp. 591-614.

(Continued)

*Primary Examiner* — Philip Y Louie
(74) *Attorney, Agent, or Firm* — Cantor Colburn LLP

(57) ABSTRACT

A process for converting a feed comprising C2-C4 alkanes to higher hydrocarbon(s) including aromatic hydrocarbon(s) in n reaction zones operated in series, wherein m reaction zones are not participating in the conversion process and only (n-m) reaction zones are operated under reaction conditions sufficient to convert at least a portion of said a feed comprising C2-C4 alkanes to an effluent having said higher hydrocarbon(s). An object of the present invention is to provide a process for converting LPG to higher hydrocarbon (s) including aromatic hydrocarbon(s) wherein a high reactant, i.e. ethane, propane and/or butane, conversion can be achieved.

21 Claims, 9 Drawing Sheets

(51) Int. Cl.
*C10G 45/70* (2006.01)
*C10G 65/04* (2006.01)

(52) U.S. Cl.
CPC ....... *B01J 2208/02* (2013.01); *C10G 2400/30* (2013.01)

(58) Field of Classification Search
USPC ........................................................ 585/412
See application file for complete search history.

(56) References Cited

U.S. PATENT DOCUMENTS

| | | | |
|---|---|---|---|
| 4,120,910 A | 10/1978 | Chu | |
| 4,157,356 A | 6/1979 | Bulford et al. | |
| 4,180,689 A | 12/1979 | Davies et al. | |
| 4,456,779 A | 6/1984 | Owen | |
| 4,613,424 A * | 9/1986 | Schorfheide | C10G 59/02 208/138 |
| 4,861,932 A * | 8/1989 | Chen | C07C 5/417 585/412 |
| 5,523,503 A | 6/1996 | Funk et al. | |
| 5,525,311 A | 6/1996 | Girod et al. | |
| 5,883,031 A * | 3/1999 | Innes | B01J 29/90 208/138 |
| 6,177,374 B1 | 1/2001 | Pradhan et al. | |
| 2006/0070918 A1 | 4/2006 | Seapan et al. | |
| 2009/0177020 A1* | 7/2009 | Suzuki | C07C 2/84 585/407 |
| 2010/0305374 A1* | 12/2010 | Iaccino | C07C 2/76 585/254 |
| 2012/0004488 A1 | 1/2012 | Sun et al. | |
| 2012/0253089 A1* | 10/2012 | Iyer | C07C 2/76 585/300 |
| 2013/0109897 A1* | 5/2013 | Morrison | C10G 35/04 585/400 |
| 2013/0153503 A1 | 6/2013 | Corradi | |
| 2019/0024000 A1 | 1/2019 | Dittrich | |

FOREIGN PATENT DOCUMENTS

| | | |
|---|---|---|
| CN | 105132063 A | 12/2015 |
| EP | 14175735 | 1/2016 |
| GB | 809024 A | 2/1959 |
| WO | 0244306 A1 | 6/2002 |
| WO | 2004013095 A2 | 2/2004 |
| WO | 2004058400 A1 | 7/2004 |
| WO | 2005085157 A1 | 9/2005 |
| WO | 2007055488 A1 | 5/2007 |
| WO | 2013182534 A1 | 12/2013 |
| WO | 2015000840 A1 | 1/2015 |

OTHER PUBLICATIONS

European Search for European Application No. 15199876.2; dated Jun. 17, 2016; 10 pages.
International Search Report for International Application No. PCT/EP2016/079801; dated Jan. 2, 2017; 4 Pages.
Written Opinion of the International Search Report for International Application No. PCT/EP2016/079801; dated Jan. 2, 2017; 4 Pages.
Alfke et al., "Oil Refining", Ullmann's Encyclopedia of Industrial Chemistry, 2007, 55 pages.
Hampton, C., et al. Controlling Hydrocracker Temperature Excursions, 2011, 2011 Q&A, PD-11-01, NPRA. (Year: 2011).
China Office Action and Search Report for China Application No. 2016800731771; filed Dec. 6, 2016; dated Jun. 30, 2020, 12 pages.

* cited by examiner

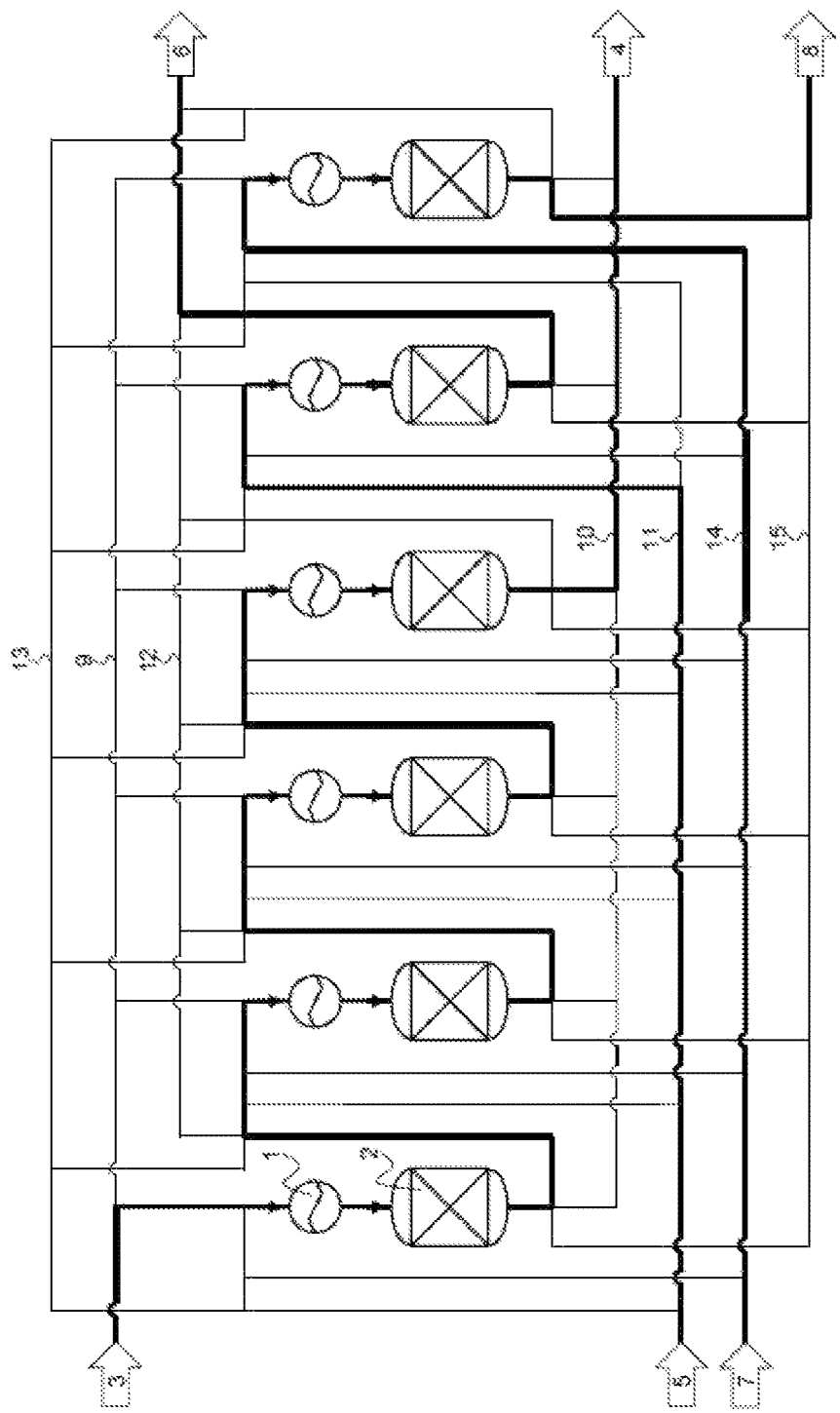

PROCESS FOR CONVERTING LPG TO HIGHER HYDROCARBON(S)

CROSS REFERENCE TO RELATED APPLICATIONS

This application is a 371 of International Application No. PCT/EP2016/079801, filed Dec. 6, 2016, which claims priority to European Application No. 15199876.2, filed Dec. 14, 2015, both of which are incorporated herein by reference in their entirety.

The present invention relates to a process for converting LPG to higher hydrocarbon(s). More in detail, the present invention relates to a process for converting a feed comprising C2-C4 alkanes to higher hydrocarbon(s) including aromatic hydrocarbon(s) in n reaction zones operated in series, wherein m reaction zones are not participating in the conversion process and only (n-m) reaction zones are operated under reaction conditions sufficient to convert at least a portion of said feed comprising C2-C4 alkanes to an effluent having said higher hydrocarbon(s).

Aromatic hydrocarbons, particularly benzene, toluene, ethylbenzene and xylenes, are important commodity chemicals in the petrochemical industry. Currently, aromatics are most frequently produced from petroleum-based feedstocks by a variety of processes, including catalytic reforming, catalytic cracking, and steam cracking.

It has been previously described that lower paraffins can be converted into aromatic hydrocarbons, such as BTX, using an aromatization process; see Encyclopaedia of Hydrocarbons (2006) Vol II, Chapter 10.6, p. 591-614. Such aromatization processes are characterized in that the catalyst is quickly deactivated by the deposition of coke, which requires the selection of circulating fluidized bed reactors or moving beds reactors to allow continuous catalyst regeneration.

However, such circulating fluidized beds or moving beds require engineering of an expensive solids transport system and the catalyst is subjected to mechanical forces (grinding and attrition, dust formation) stronger than in fixed beds. Furthermore, freshly regenerated catalyst contacts already partially converted reactant mixture at high temperature in a countercurrent moving bed with external catalyst reheating. Coking of catalyst will start quickly again. At the fluid inlet/catalyst outlet, deactivated catalyst contacts fresh reactant at low temperature. In other words, the catalyst activity is low at the fluid inlet/catalysts outlet (low temperature+deactivated catalyst) and high at the fluid outlet/catalyst inlet (high temperature+active catalyst). The increasing catalyst activity profile along the reactant flow direction leads to a lower space-time yield, hence a bigger reactor and a lower catalyst utilization rate, compared to a more even activity profile.

An object of the present invention is to provide a process for converting LPG to higher hydrocarbon(s) including aromatic hydrocarbon(s) wherein a high reactant, i.e. ethane, propane and/or butane, conversion can be achieved.

Another object of the present invention is to provide a process for converting LPG to higher hydrocarbon(s) including aromatic hydrocarbon(s) wherein coke formation on the catalyst is controlled.

An object of the present invention is to provide a process for converting LPG to higher hydrocarbon(s) including aromatic hydrocarbon(s) wherein the physical movement of particulate catalyst is avoided.

The present invention thus provides a process for converting LPG to higher hydrocarbon(s) including aromatic hydrocarbon(s) in n reaction zones operated in series, wherein m reaction zones are not participating in the conversion process and only (n-m) reaction zones are operated under reaction conditions sufficient to convert at least a portion of said LPG to an effluent having said higher hydrocarbon(s), wherein each reaction zone is initially numbered serially with a designator from 1 to n, the process comprising:

(a) providing a quantity of catalytic material within each reaction zone;

(b) providing to the reaction zone designated as 1 a hydrocarbon feedstock containing LPG;

(c) heating at least a portion of the effluent of the said reaction zone designated as 1 to the inlet temperature of the reaction zone designated as 2, and more generally, heating at least a portion of the effluent of each reaction zone with a designator equal or smaller than (n-m-1) to the inlet temperature of the reaction zone with a designator larger by one than that of the reaction zone from which said effluent originates;

(d) transferring said at least portion of said effluent of the said reaction zone designated as 1 to said reaction zone designated as 2, and more generally, transferring said at least portion of said reaction zone with a designator equal or smaller than (n-m-1) to the reaction zone with a designator larger by one than that of the reaction zone from which said at least portion of said effluent originates;

(e) maintaining said reaction zone designated as 2 at an average temperature higher than or equal as in reaction zone designated as 1, and more generally, maintaining each reaction zone with a designator equal or smaller than (n-m) at an average temperature higher or equal as in the reaction zone with designator smaller by one than that of said reaction zone, feeding the effluent from the reaction zone with the designator (n-m) to another process unit, and regenerating the reaction zones with a designator larger than (n-m), followed by (f) terminating transferring effluent from the reaction zone with the designator (n-m-1) to the reaction zone with the designator (n-m);

(g) starting regenerating said reaction zone with the designator (n-m) containing deactivated catalytic material;

(h) raising the inlet temperature of each reaction zone with a designator equal or smaller than (n-m-1) to the former inlet temperature of the reaction zones with a designator larger by one than that of said reaction zone, respectively;

(i) changing the value of each designator equal or smaller than (n-1) to a number larger by one than its initial value, and changing the value of the designator with a value of n to 1, (j) repeating steps (b) to (i).

One or more of the above identified objects can be achieved by the present method.

The term "aromatic hydrocarbons" or "aromatics" is very well known in the art. Accordingly, the term "aromatic hydrocarbon" relates to cyclically conjugated hydrocarbon with a stability (due to delocalization) that is significantly greater than that of a hypothetical localized structure (e.g. Kekulé structure). The most common method for determining aromaticity of a given hydrocarbon is the observation of diatropicity in the 1H NMR spectrum, for example the presence of chemical shifts in the range of from 7.2 to 7.3 ppm for benzene ring protons. The term "BTX" as used herein relates to a mixture of benzene, toluene and xylenes.

As used herein, the term "C# hydrocarbons", or "C#", wherein "#" is a positive integer, is meant to describe all hydrocarbons having # carbon atoms. Moreover, the term "C#+ hydrocarbons" is meant to describe all hydrocarbon molecules having # or more carbon atoms. Accordingly, the term "C9+ hydrocarbons" is meant to describe a mixture of hydrocarbons having 9 or more carbon atoms. The term "C9+ alkanes" accordingly relates to alkanes having 9 or more carbon atoms.

The term "LPG" as used herein refers to the well-established acronym for the term "liquefied petroleum gas". LPG generally consists of a blend of C2-C4 alkanes i.e. a mixture of C2, C3, and C4 alkanes.

The hydrocarbon feedstock used in the process of the present invention may be blend of C2-C4 alkanes. Preferably, the hydrocarbon feedstock used in the process of the present invention is essentially free of methane. As used herein, the term "essentially free of" means that the composition in question comprises at most 5 wt-% the other component(s), preferably at most 3 wt-% of the other component(s), more preferably at most 2 wt-% of the other component(s) and most preferably at most 1 wt-% of the other component(s). The hydrocarbon feedstock used in the process of the present invention may be essentially free of other hydrocarbons than ethane or may be essentially free of other hydrocarbons than propane or may be essentially free of other hydrocarbons than butane. Preferably, the LPG used as a hydrocarbon feedstock in the process of the present invention consists of one or more selected from the group consisting of ethane, propane and butane.

The above described sequence is repeated each time the last reactor through which the reactant/products mixture passes, and hence with the highest average temperature and coke level, needs regeneration. In this way, an apparent cocurrent flow pattern between the reactant/products mixture and the catalyst is established without physical movement of the catalyst with the associated problems of solids handling and catalyst attrition. While passing the (n-m) catalyst beds on stream the reactant/products mixture experiences a saw tooth-like but overall constant or increasing profile of the average temperature. The average bed temperature is defined as arithmetic mean of the reactor inlet and outlet temperature. It should be noted that the above identified parameters "n reaction zones operated in series", "m reaction zones not participating in the conversion process" and "(n-m) reaction zones operated under reaction conditions" leave room for an embodiment wherein less than (n-m) reaction zones are under regeneration conditions, or an embodiment wherein different types of regeneration methods are applied. The present method is preferably carried out when the n reaction zones are of equal size.

In addition a higher ethane, propane and/or butane conversion can be achieved with an increasing temperature profile because the equilibrium conversion, which represents the driving force for the reaction rate, corresponds to the reactor outlet temperature. It holds for endothermic equilibrium reactions that the equilibrium conversion is higher at higher temperature. A reactor with an increasing temperature profile therefore can provide more driving force for the conversion than an adiabatic reactor with decreasing temperature profile. If the reaction zones are operated adiabatically, the heat of reaction will need to be provided by increasing the temperature of each stream being transferred from each reaction zone with a designator equal to or smaller than (n-m-1) to a reaction zone with a designator larger by one than that of said reaction zone. The total heat of reaction can be evenly distributed over (n-m) reaction zones of equal size with an increasing profile of the average temperature.

The present inventor found that the process of the present invention can also be used for establishing an apparent countercurrent flow pattern between the reactant/product mixture and the catalyst. According to such an apparent cocurrent flow pattern operation the present method comprises the same steps (a) to (e) as discussed before, followed by (f) terminating transferring effluent from the reaction zone designated as 1 to the reaction zone designated as 2;

(g) starting regenerating the reaction zone designated as 1 containing deactivated catalytic material;

(h) decreasing the inlet temperature of each reaction zone with a designator larger than 1 and equal or smaller than (n-m) to the former inlet temperature of the reaction zones with a designator smaller by one than that of said reaction zone, respectively;

(i) changing the value of each designator equal and larger than 2 to a number smaller by one than its initial value, and changing the value of the designator with value 1 to n, (j) repeating steps (b) to (i).

In such an apparent countercurrent flow pattern mode, the catalyst in those of the first (n-m) reactions zones with designated by a smaller value is more deactivated and hence less active. It is therefore easier to evenly distribute the total heat of reaction over (n-m) adiabatic reaction zones of equal size, even without an increasing profile of average bed temperatures in reaction zones (n-m).

According to a preferred embodiment of the present invention the reaction zones are adiabatic catalytic fixed bed reaction zones. Adiabatic catalytic fixed bed reaction zones can be axial flow fixed bed reactors or radial flow fixed bed reactors.

The process of the present invention involves aromatization of LPG, which comprises contacting the LPG with an aromatization catalyst under aromatization conditions. The process conditions useful for aromatization, also described herein as "aromatization conditions", can be easily determined by the person skilled in the art; see Encyclopaedia of Hydrocarbons (2006) Vol II, Chapter 10.6, p. 591-614. In said aromatization, further useful products are produced in addition to the aromatic hydrocarbons, including ethane and hydrogen.

The term "aromatization" is used herein in its generally accepted sense and thus may be defined as a process to convert aliphatic hydrocarbons to aromatic hydrocarbons. There are many aromatization technologies described in the prior art using C2-C4 aliphatic hydrocarbons as raw material; see e.g. U.S. Pat. Nos. 4,056,575; 4,120,910; 4,157,356; 4,180,689; WO 2004/013095 A2 and WO 2005/085157 A1. Accordingly, the aromatization catalyst may comprise a zeolite, preferably selected from the group consisting of ZSM-5 and zeolite L and may further comprising one or more elements selected from the group consisting of Ga, Zn, Ge and Pt. Preferably, the aromatization catalyst comprises and acidic zeolite. As used herein, the term "acidic zeolite" relates to a zeolite in its default, protonic form. Preferably, the catalyst is selected from the group consisting of HZSM-5 (wherein HZSM-5 describes ZSM-5 in its protonic form), Ga/HZSM-5, Zn/HZSM-5 and Pt/GeHZSM-5. The aromatization conditions may comprise a temperature of 400-600° C., preferably 450-550° C., more preferably 480-520° C. a pressure of 100-1000 kPa gauge, preferably 200-500 kPa gauge, and a Weight Hourly Space Velocity (WHSV) of 0.1-20 $h^{-1}$, preferably of 0.4-4 $h^{-1}$.

Preferably, the aromatization comprises contacting the LPG with an aromatization catalyst under aromatization conditions, wherein the aromatization catalyst comprises a zeolite selected from the group consisting of ZSM-5 and zeolite L, optionally further comprising one or more elements selected from the group consisting of Ga, Zn, Ge and Pt and wherein the aromatization conditions comprise a temperature of 450-550° C., preferably 480-520° C. a pressure of 100-1000 kPa gauge, preferably 200-500 kPa gauge, and a Weight Hourly Space Velocity (WHSV) of 0.1-20 $h^{-1}$, preferably of 0.4-4 $h^{-1}$.

The number ratio of reactors on stream (n-m) and in regeneration (m) is determined depending on the ratio of durations of coke build-up during reaction, and purging, cooling down and regeneration. If these durations change, e.g. because a better catalyst is implemented or the operating conditions are changed, the number of reactors on stream (n-m) and in regeneration (m) can be adjusted accordingly without any hardware modification. A new sequence for routing the inter-reactor streams is sufficient. In a preferred embodiment the total number of reaction zones, n, is at least 4, preferably at least 6, wherein said total number of reaction zones not participating in the conversion process is at most 4, preferably at most 2, respectively. However, the present invention is not limited to a specific number of reaction zones or to a specific number of reaction zones not participating in the conversion process.

According to a preferred embodiment step (f) further comprises monitoring the temperature drop along said bed of catalytic material and terminating transferring effluent when said temperature drop comes below a threshold value, or the outlet temperature exceeds a certain threshold value.

According to a preferred embodiment the inlet temperatures of reactor zones 1 to (n-m) are adjusted slightly during the period between two cycle switching events in order to compensate for activity loss of catalyst inside the reaction zones 1 to (n-m) during said period. As a result, the temperature drop along the catalyst beds in reaction zones 1 to (n-m) remains constant or deviates not more than 10% from a constant value.

According to a preferred embodiment step (g) further comprises cooling down (n-m)th reaction zone bed of catalytic material in apparent cocurrent flow pattern operation with a purge gas and passing a regeneration gas through the thus cooled bed of catalytic material. It analogously comprises cooling down first reaction zone bed of catalytic material in apparent countercurrent flow pattern operation. The purge gas can be any gas that does not or to not much extend react with the catalyst and reactant and product, for example steam, nitrogen or noble gases. Preferably, nitrogen is used as purge gas.

Coke formation increases with higher temperatures and limits the reaction rate. It is secured with the increasing temperature profile and simulated cocurrent flow that the catalyst is hardly deactivated by coke at low temperature and most deactivated at high temperature where reaction rates are high anyway. The hottest and most deactivated catalyst is the first to be regenerated in the next cycle. Hence, the catalyst coking level increases together with increasing temperature in flow direction of the reactant/product mixture. The catalyst is regenerated by coke removal via combustion. If the catalyst is not heat sensitive, or does not form volatile components with oxygen or steam, (enriched) air, or mixtures of steam and (enriched) air can be used to convert coke into carbon oxides. If the catalyst forms volatile components with oxygen, hydrogen-rich gas can be used to convert coke into methane or other hydrocarbons by hydrogenolysis.

Catalyst regeneration by both, combustion or hydrogenolysis, is exothermic and heats up the adiabatic fixed beds. It therefore can be necessary to cool down the catalyst bed prior to regeneration such that it reaches the desired temperature level after regeneration and prior to the next reaction cycle. The reactor to be cooled down can serve as a feed preheater to the first reactor in operation simply by switching off the preheater of the reactor to be cooled down when the end of a cycle approaches.

The regeneration gas is preferably chosen from the group of steam, air, oxygen and hydrogen, or suitable mixtures thereof.

In a preferred embodiment the regeneration gas comprises at least two different components, wherein the different components are dosed together or the different components are dosed in a cycle.

It is often beneficial to regenerate the catalyst by burning off coke at not too high temperature in order to avoid that the large combustion exotherm irreversibly damages the catalyst.

In a preferred embodiment regeneration by coke combustion with oxygen-containing regeneration gas is carried out at a temperature lower than the minimum temperature at which the reaction in reaction zone 1 to (n-m) takes place.

The underlying principle of the present invention can also be applied to other endothermic hydrocarbon conversions accompanied by coke formation, such as dehydrogenation of paraffins and alkyl benzenes, and catalytic reforming of naphtha.

The present invention will now be discussed by way of an example.

FIG. 1b shows another phase of the same process for converting LPG to higher hydrocarbon(s) including aromatic hydrocarbon(s) with simulated cocurrent flow of reactants, products and catalyst.

No valves are shown in FIGS. 1a-1g for better readability. Pipelines with fluid flow are marked by bold line and pipelines without fluid flow are marked by thin lines.

Figure 1A:
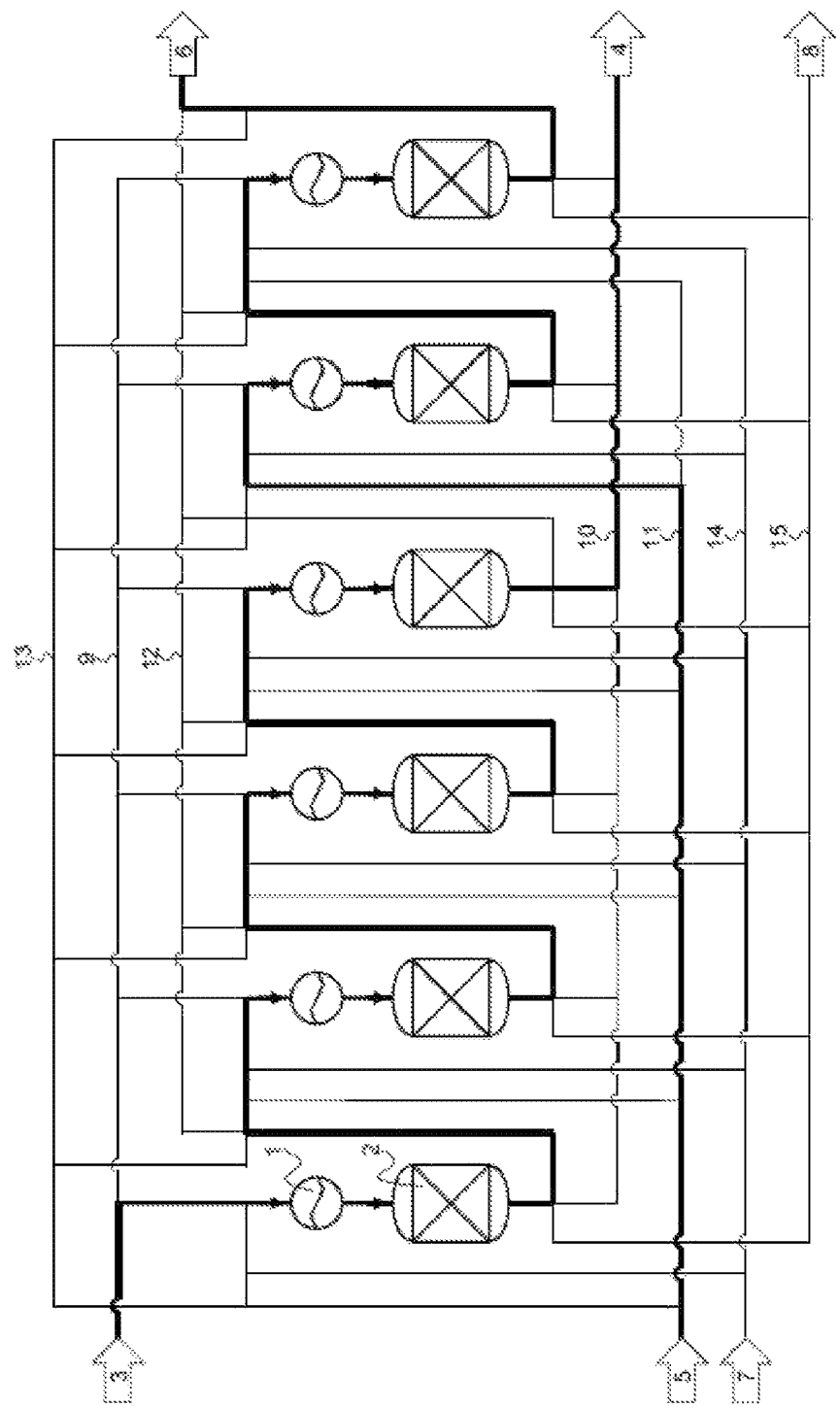
FIG. 1a shows an embodiment of a process for converting LPG to higher hydrocarbon(s) including aromatic hydrocarbon(s).
Figure 1C:
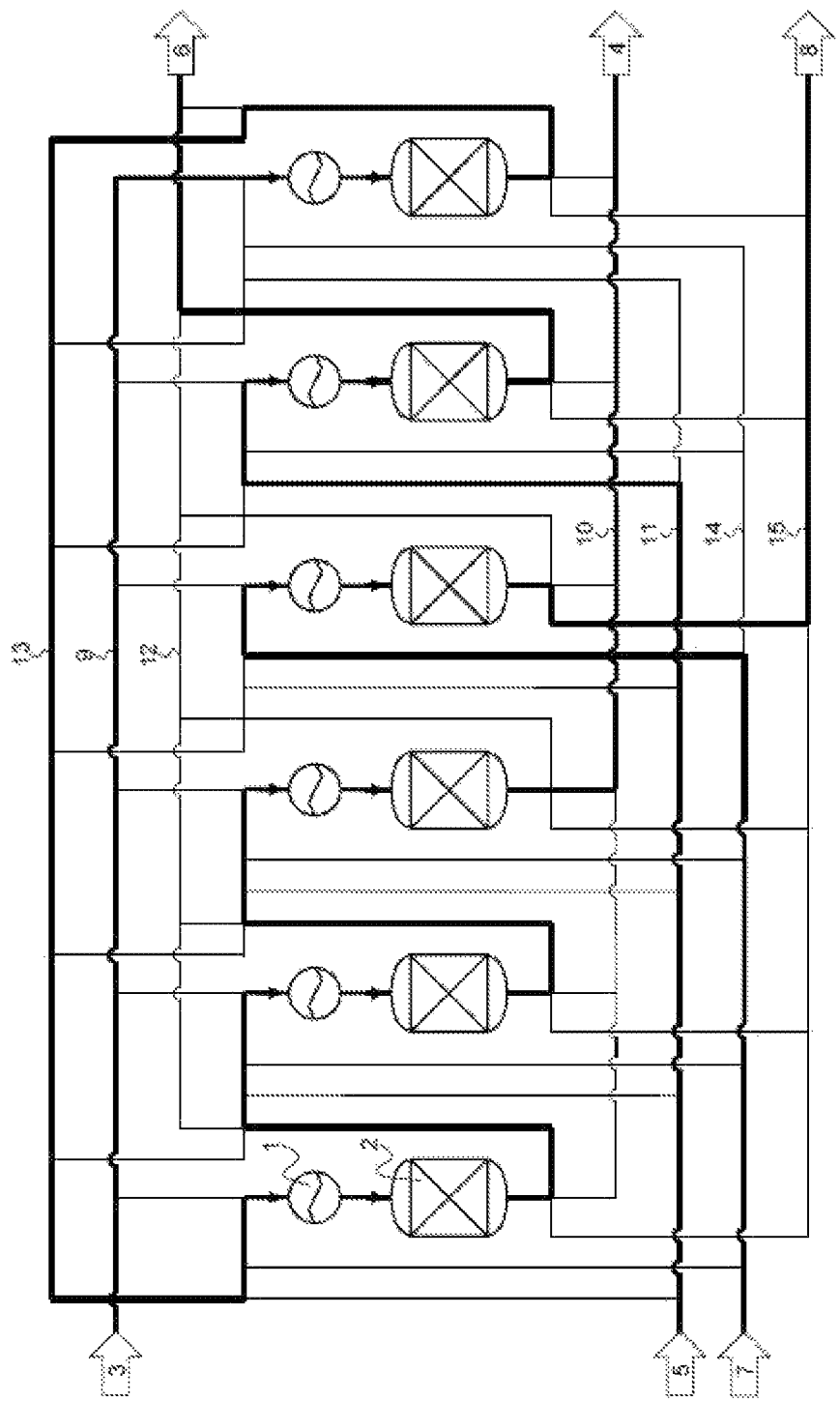
FIG. 1c shows another phase of the same process for converting LPG to higher hydrocarbon(s) including aromatic hydrocarbon(s) with simulated cocurrent flow of reactants, products and catalyst.
Figure 1D:
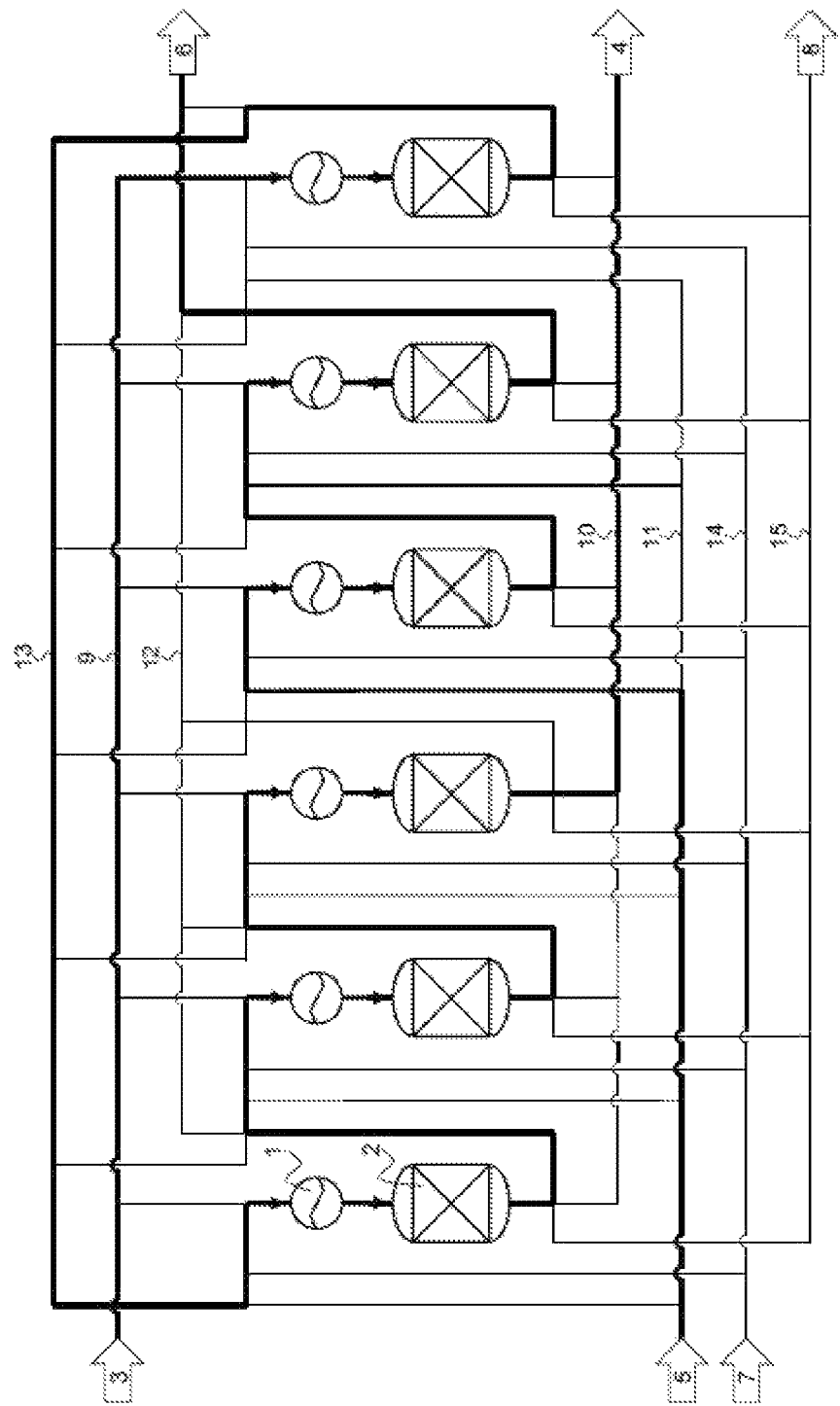
FIG. 1d shows another phase of the same process for converting LPG to higher hydrocarbon(s) including aromatic hydrocarbon(s) with simulated cocurrent flow of reactants, products and catalyst.
Figure 2A:
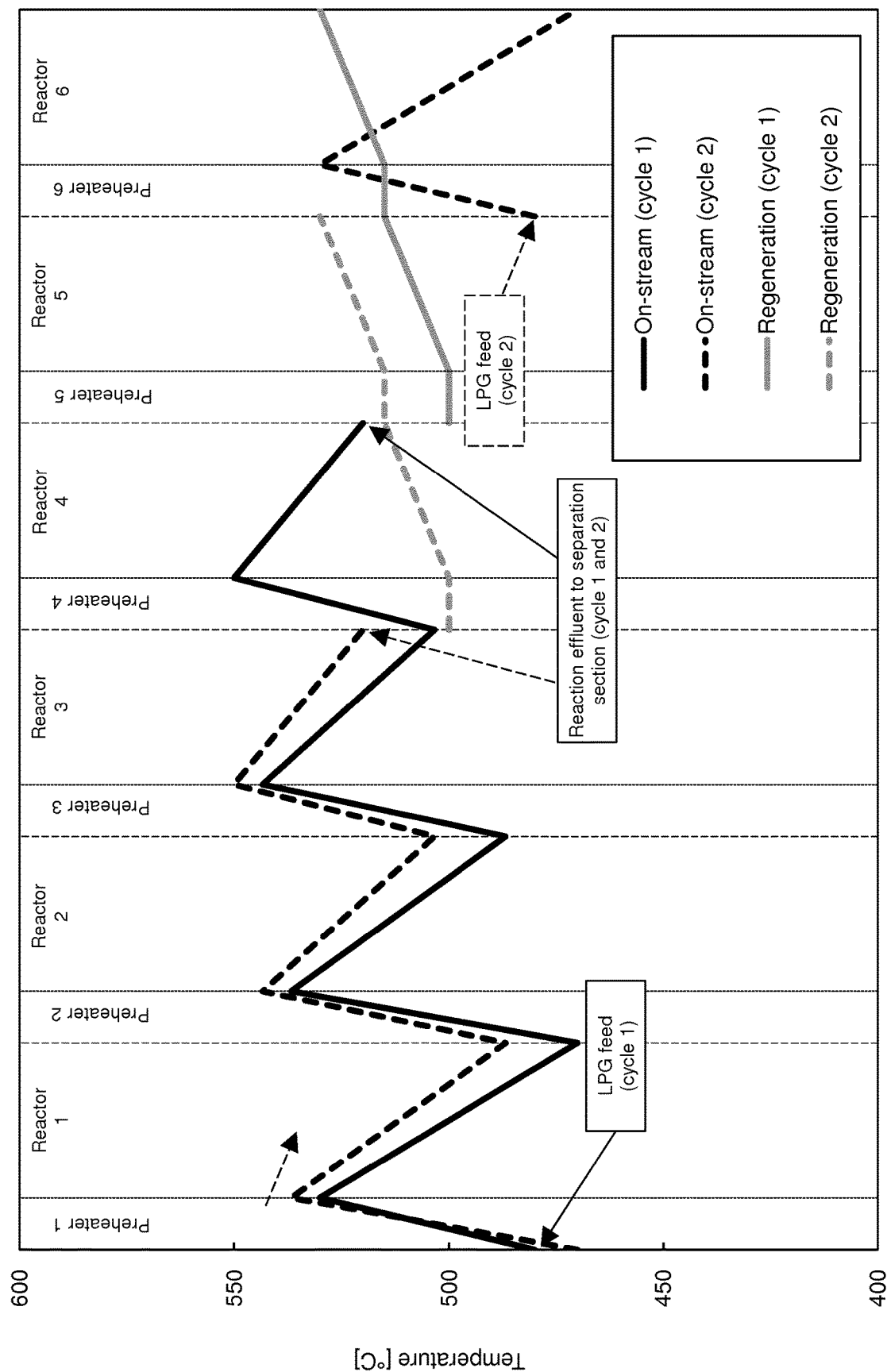

FIG. 2a illustrates the temperature profile during the first two cycles shown in FIGS. 1a-1d.

Figure 1E:
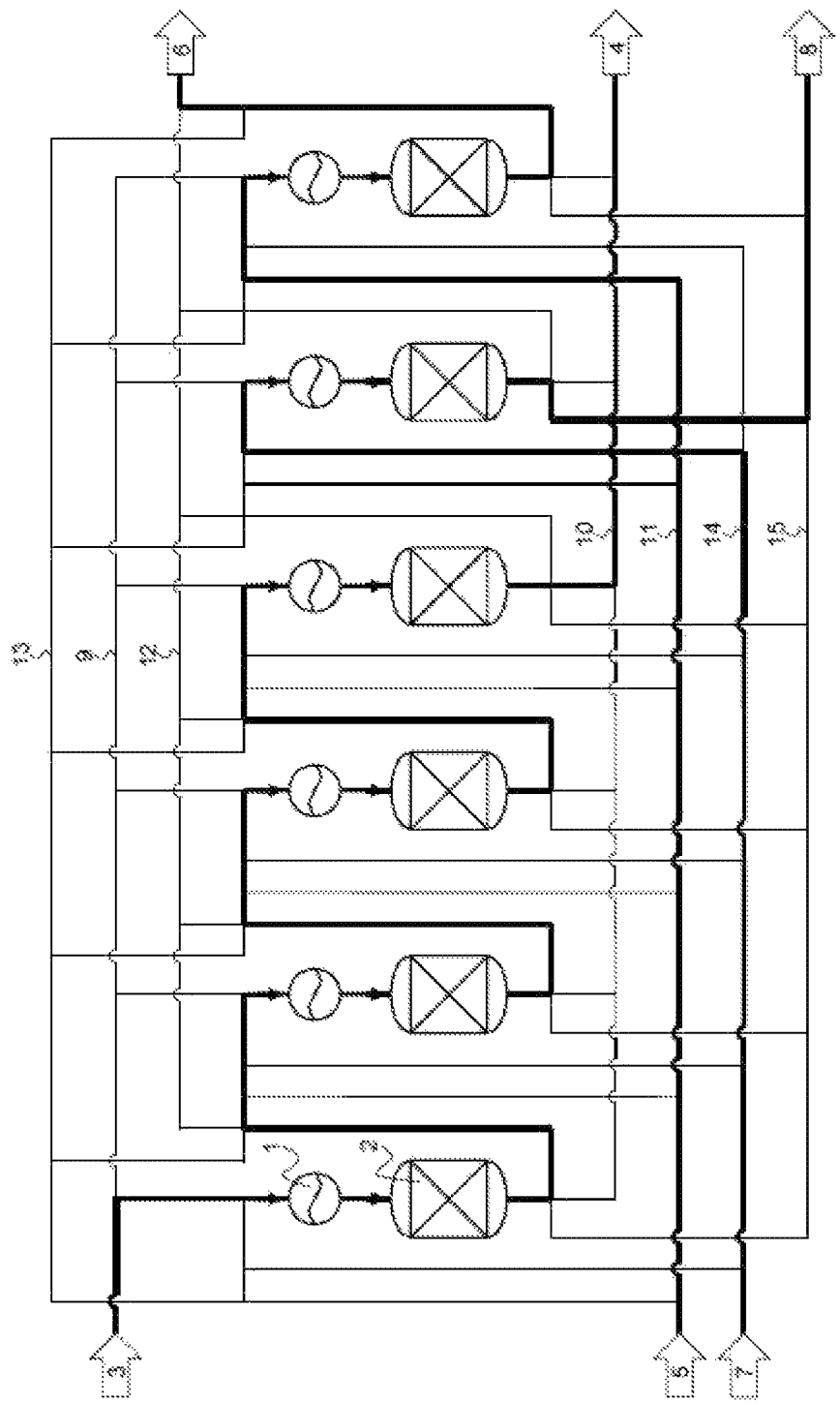
FIG. 1e shows another phase of the process for converting LPG to higher hydrocarbon(s) including aromatic hydrocarbon(s) with simulated countercurrent flow of reactants, products and catalyst.
Figure 1F:
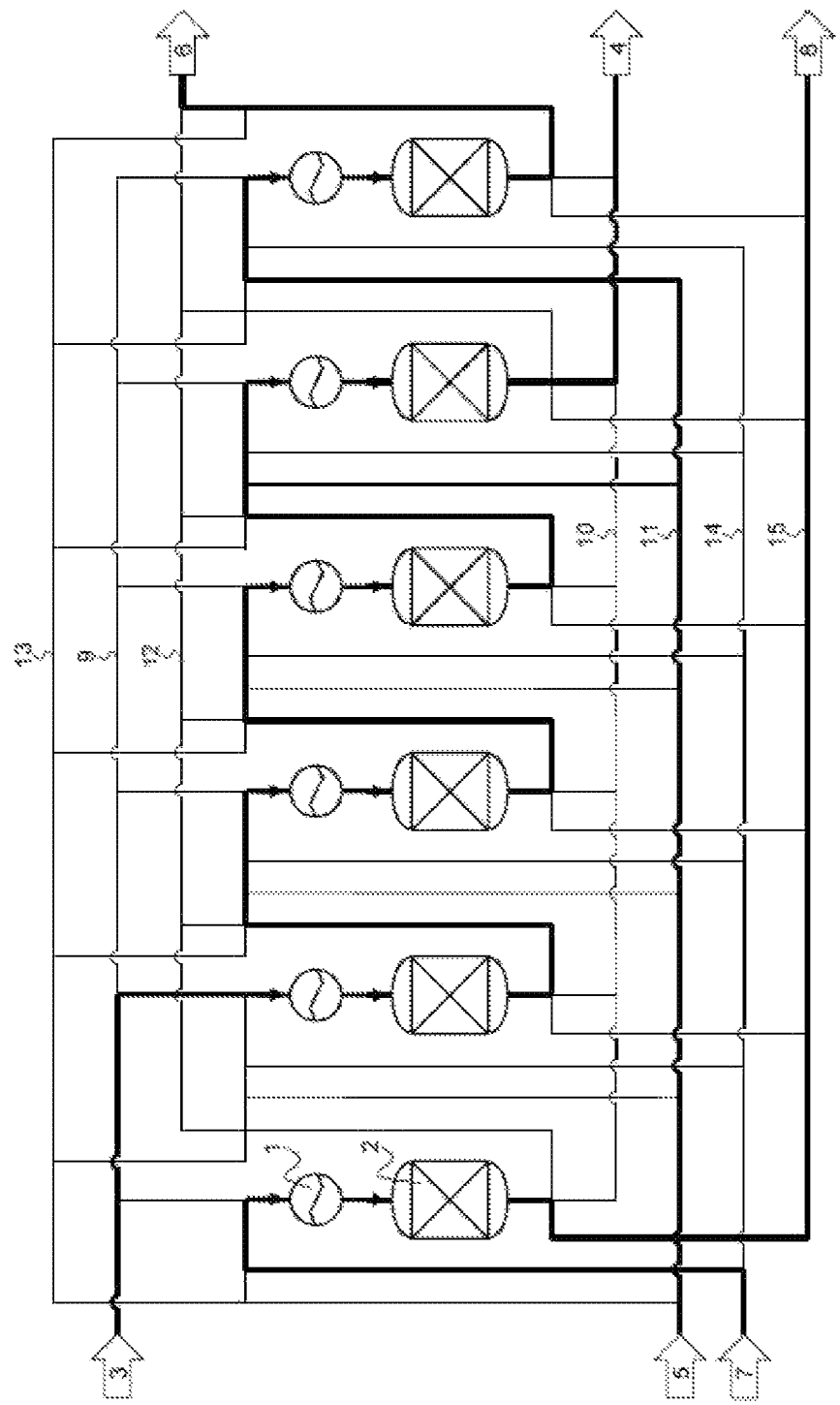
FIG. 1f shows another phase of the process for converting LPG to higher hydrocarbon(s) including aromatic hydrocarbon(s) with simulated countercurrent flow of reactants, products and catalyst.
Figure 1G:
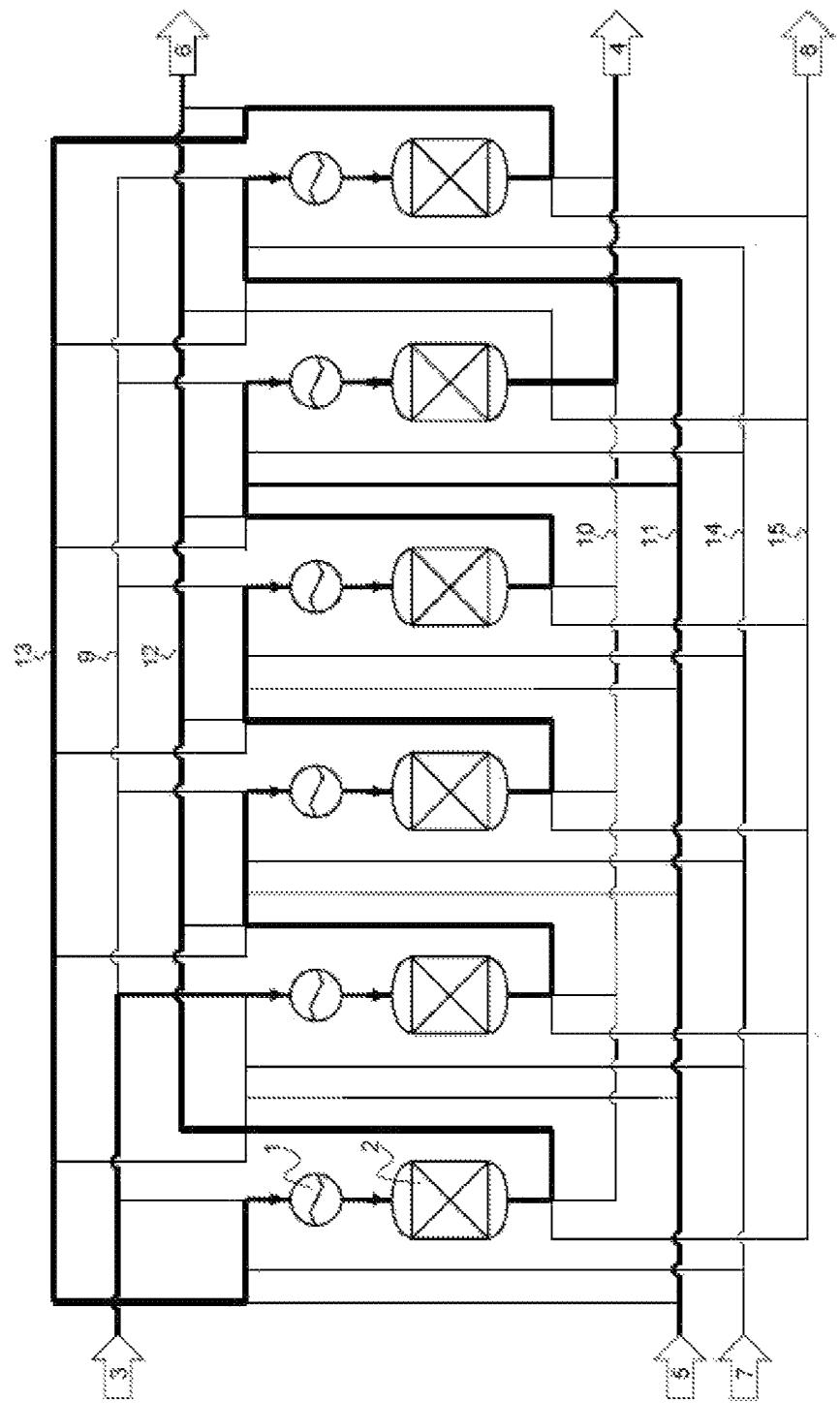
FIG. 1g shows another phase of the process for converting LPG to higher hydrocarbon(s) including aromatic hydrocarbon(s) with simulated countercurrent flow of reactants, products and catalyst.
Figure 2B:
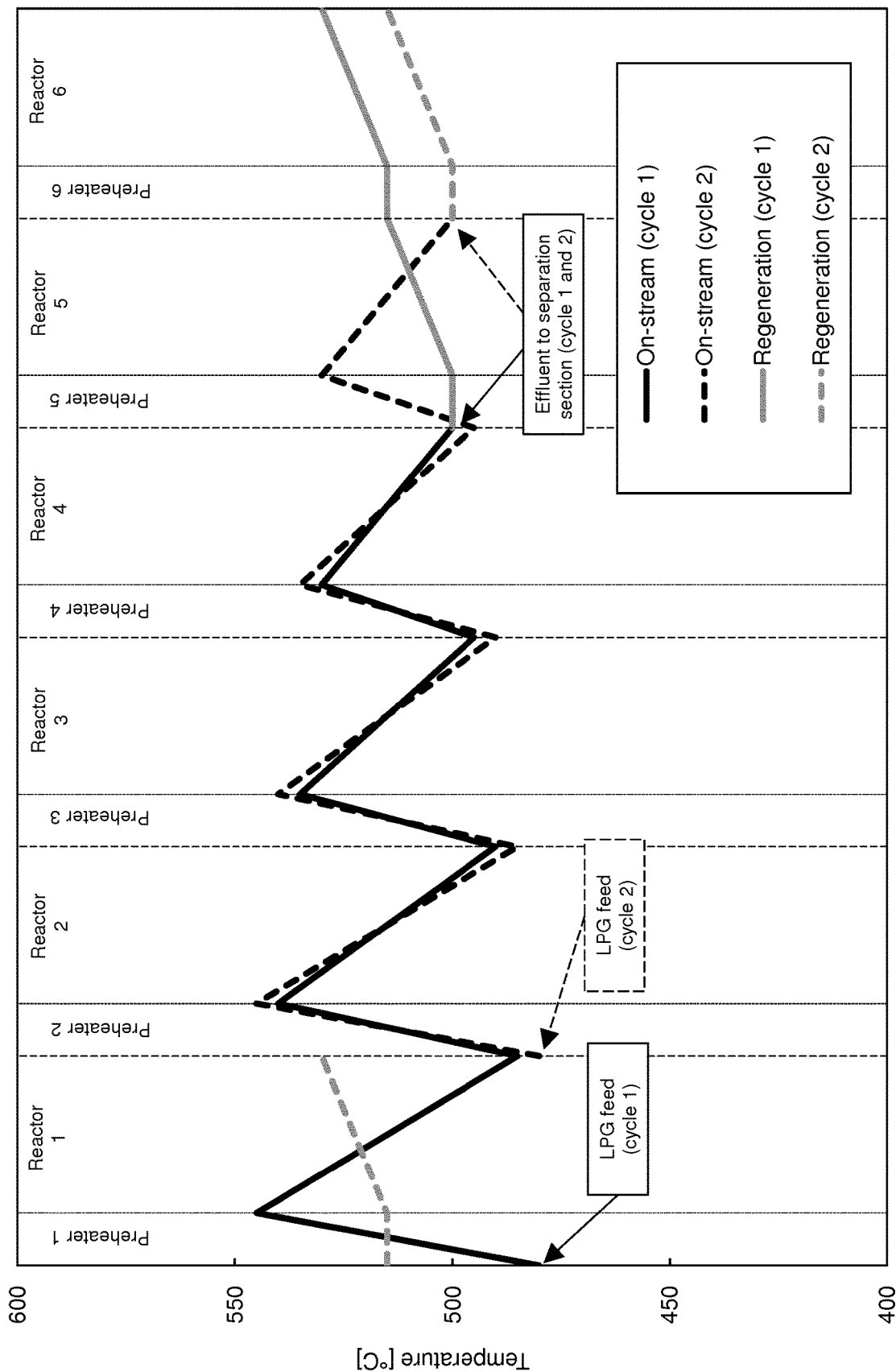

FIG. 2b illustrates the temperature profile during the first two cycles shown in FIGS. 1a and 1e-1g.

Hydrocarbon feedstock is fed to the first of a series of n adiabatic catalytic fixed bed reactors. The feed is brought to a preset temperature in the preheater of the first reactor. Each reactor contains particulate catalyst, e.g. a catalyst comprising a zeolite selected from the group consisting of ZSM-5 and zeolite L, optionally further comprising one or more elements selected from the group consisting of Ga, Zn, Ge and Pt, which converts LPG into BTX and other higher hydrocarbons. m reactors are being regenerated in order to remove coke from the catalyst while n-m reactors are on stream, which means convert LPG into aromatics.

The mixture of reactant and nascent products passes through the first adiabatic reactor where it cools down due to the endothermic nature of the reaction. Hence, a decreasing temperature profile along the flow direction is established inside the catalytic fixed bed of the first reactor. After leaving the first reactor, the effluent is heated up again and enters the second reactor. More LPG is converted into BTX in the second reactor where the reactant/product mixture cools down and a declining temperature profile is again established. The outlet temperature of the second reactor is higher than the outlet temperature of the first reactor. The sequence of reheating the reactant/product mixture, the conversion of the reheated mixture inside each reactor accompanied by temperature decrease, and the converted mixture leaving each reactor at a higher temperature than the outlet temperature of the previous reactor is repeated according to the total number (n-m) of reactors on stream.

The detailed discussion of the FIGS. 1a-1g relates to the specific embodiment of the present invention in which the overall temperature profile increases.

Example 1

A first example is given in FIG. 1a with n=6 reactors of which m=2 reactors are regenerated and which are operated to simulate a cocurrent flow pattern of reactant-feed mixture and solid catalsyst. The effluent of the last (n-m)th reactor on stream is quenched and fed to the product separation section of the process. As a result of the increasing profile of the inlet temperatures of each of the (n-m) reactors on stream the catalytic fixed bed of the (n-m)th reactor has the highest average temperature (FIG. 2a). This implies that the rate of coke formation, which is an undesired side reaction, is highest and therefore the catalyst deactivates most quickly in the (n-m)th reactor.

When a preset minimum conversion is reached indicated by a minimum temperature drop along the catalytic bed of the (n-m)th reactor as result of catalyst deactivation, the (n-m)th reactor will be taken off stream and regenerated. For this, the catalytic bed is first cooled down by a purge gas, e.g. nitrogen (FIG. 1b), and then the catalyst is regenerated by converting coke with a regeneration gas. At the same time, all inlet temperature set points of the first to (n-m-1)th reactor are raised to the values of the second to (n-m)th reactor before the (n-m)th reactor was taken off stream for regeneration. The nth reactor was regenerated until now and is purged from regeneration gas, e.g. preheated diluted air (FIG. 1c). Then the feed stream is not fed to the first reactor anymore but to the nth reactor (FIG. 1d). The inlet temperature set point of the nth reactor is now the same as for the first reactor before the (n-m)th reactor was taken off stream for regeneration. According to FIG. 1d the effluent of the nth reactor is now routed to the first reactor (n=6 and m=2).

The (n-m-1)th reactor has the highest average temperature now (FIG. 2a) and will be the next one to be regenerated. Once the temperature drop inside the (n-m-1)th reaches a preset minimum value the same switching sequence is triggered like described above. After the new switching event, the feed will be routed to the (n-1)th reactor, the average temperature level in the (n-m-2)th reactor will be the highest and the effluent of the (n-m-2)th reactor is fed to the product separation section (n=6 and n=2).

The process as discussed above has been disclosed in Table 1 and FIG. 2a.

TABLE 1

Schematic overview of status of reaction zones in the process according to the invention (example 1, cocurrent flow of reactant, products and catalyst)

| | | Reaction zone (number) | | | | | |
|---|---|---|---|---|---|---|---|
| | | 1 | 2 | 3 | 4 | 5 | 6 |
| Cycle | 1 | R | R | R | R | X | X |
| | 2 | R | R | R | X | X | R |
| | 3 | R | R | X | X | R | R |
| | 4 | R | X | X | R | R | R |
| | 5 | X | X | R | R | R | R |
| | 6 | X | R | R | R | R | X |
| | 7 | R | R | R | R | X | X |

From Table 1 one can deduce that in the first cycle only reaction zones 1-4 are participating in the conversion process whereas reaction zones 5-6 are not participating in the conversion process. The sequence in the first cycle is thus 1-2-3-4 (on stream) and 5-6 (off stream). In the second cycle reaction zone 6 is taken on stream and the "first" reaction zone will now be reaction zone 6. The effluent from reaction zone 6 is fed to the inlet of first reaction zone, now being reaction zone 1. The sequence in the second cycle is thus 6-1-2-3 (on stream) and 5-6 (off stream), wherein the highest temperature is in reaction zone 3. The sequence in the third cycle is thus 5-6-1-2 (on stream) and 3-4 (off stream), wherein the highest temperature is in reaction zone 2. This table 1 shows a number of seven cycles wherein the situation of cycle 1 is similar to cycle 7. As mentioned before, the present invention is not restricted to any specific number of reaction zones.

In the FIGS. 1a-1g the reference numbers used refer to the following:
1 Preheater 1 to n (6)
2 Reaction zone 1 to n (6)
3 LPG feed
4 Product mixture
5 Oxygen-containing regeneration gas feed
6 Regeneration gas effluent
7 Purge gas feed
8 Purge gas effluent Example 2

A second example is given in FIG. 1a and-1e-1g with n=6 reactors of which m=2 reactors are regenerated with with oxygen-containing gas, and which are operated to simulate a countercurrent flow pattern of reactant-feed mixture and solid catalsyst.

The effluent of the last (fourth) reactor on stream is quenched and fed to the product separation section of the process. The catalyst beds of each of the two reactors on stream have the same average temperature. The catalyst in the first reactor has accumulated more coke and is more deactivated than that in the second to fourth reactor because it has been on stream for longer.

When a preset minimum conversion is reached indicated by a minimum temperature drop along the catalytic bed of the first reactor as result of catalyst deactivation, the first reactor will be taken off stream and regenerated. For this, the catalyst is regenerated by combusting coke with a oxygen-containing regeneration gas. At the same time, the inlet temperature set point of the second reactor is adjusted to the value of the first reactor before it was taken off stream for regeneration. The feed stream is not fed to the first reactor anymore but to the second reactor (FIG. 1g). The inlet temperature set point of the second reactor is now the same as for the first reactor before it was taken off stream for regeneration. According to FIG. 1g the effluent of the second reactor is now routed to the third reactor.

The catalyst bed of the second reactor has been on stream for the longest time now and will be the next one to be regenerated. Once the temperature drop inside the second reactor reaches a preset minimum value the same switching sequence is triggered like described above.

FIG. 1e shows how the fifth reactor is purged from oxygen-containing regeneration gas before it is coming on stream in FIG. 1f, and FIG. 1f shows How the first reactor taken off-stream is purged from hydrocarbons before taken into regeneration in FIG. 1g.

Table 2 gives an overview of a complete repetition of switching events (cycles #1 to 6),

TABLE 2

Schematic overview of status of reaction zones in the process according to the invention (example 1, countercurrent flow of reactant, products and catalyst)

| | | Reaction zone (number) | | | | | |
|---|---|---|---|---|---|---|---|
| | | 1 | 2 | 3 | 4 | 5 | 6 |
| Cycle | 1 | R | R | R | R | X | X |
| | 2 | X | R | R | R | R | X |
| | 3 | X | X | R | R | R | R |
| | 4 | R | X | X | R | R | R |
| | 5 | R | R | X | X | R | R |
| | 6 | R | R | R | X | X | R |
| | 7 | R | R | R | R | X | X |

The invention claimed is:

1. A process for converting LPG to higher hydrocarbon(s) including aromatic hydrocarbon(s) in n reaction zones operated in series, wherein m reaction zones are not participating in the conversion process and only (n-m) reaction zones are operated under reaction conditions sufficient to convert at least a portion of said LPG to an effluent having said higher hydrocarbon(s), wherein each reaction zone is initially numbered serially with a designator from 1 to n, wherein said total number of reaction zones, n, is at least 3, said total number of reaction zones not participating in the conversion process, m, is at least 1, and (n-m) is at least 2, the process comprising:
   (a) providing a quantity of catalytic material within each reaction zone;
   (b) providing to the reaction zone designated as 1 a hydrocarbon feedstock containing LPG;
   (c) heating at least a portion of the effluent of each reaction zone with a designator equal to or smaller than (n-m-1) to the inlet temperature of the reaction zone with a designator larger by one than that of the reaction zone from which said effluent originates;
   (d) transferring said at least a portion of said effluent of each reaction zone with a designator equal to or smaller than (n-m-1) to the reaction zone with a designator larger by one than that of the reaction zone from which said at least a portion of said effluent originates;
   (e) maintaining each reaction zone with a designator equal to or smaller than (n-m) at an average bed temperature higher than or equal to an average temperature in the reaction zone with a designator smaller by one than that of said reaction zone, feeding the effluent from the reaction zone with the designator (n-m) to another process unit, and regenerating the reaction zones with a designator larger than (n-m), followed by
   (f) terminating transferring effluent from the reaction zone with the designator (n-m-1) to the reaction zone with the designator (n-m);
   (g) starting regenerating said reaction zone with the designator (n-m) containing deactivated catalytic material;
   (h) raising the inlet temperature of each reaction zone with a designator equal to or smaller than (n-m-1) to the former inlet temperature of the reaction zones with a designator larger by one than that of said reaction zone, respectively;
   (i) changing the value of each designator equal to or smaller than (n-1) to a number larger by one than its initial value, and changing the value of the designator with a value of n to 1,
   (j) repeating steps (b) to (i).

2. The process according to claim 1, wherein said reaction zones are adiabatic catalytic fixed bed reaction zones.

3. The process according to claim 2, wherein said adiabatic catalytic fixed bed reaction zones are adiabatic radial flow fixed bed reactors.

4. The process according to claim 1, wherein said catalytic material comprises a zeolite selected from the group consisting of ZSM-5 and zeolite L, optionally further comprising one or more elements selected from the group consisting of Ga, Zn, Ge and Pt.

5. The process according to claim 1, wherein said total number of reaction zones, n, is at least 4.

6. The process according to claim 1, wherein step (f) further comprises determining whether the catalytic material has become deactivated by monitoring the temperature drop along a bed of catalytic material and terminating transferring effluent when said temperature drop comes below a threshold value.

7. The process according to claim 1, wherein the inlet temperature of each reaction zone not in regeneration is continuously adjusted in small steps such that the temperature drop along a catalyst bed in said reaction zone deviates not more than 10% from a constant value.

8. The process according to claim 1, wherein in said step (g) regenerating said reaction zone with the designator (n-m) containing deactivated catalytic material comprises using a regeneration gas chosen from the group of steam, air, oxygen and hydrogen, or suitable mixtures thereof.

9. The process according to claim 8, wherein said regeneration gas comprises at least two different components, wherein said at least two different components are dosed together.

10. The process according to claim 8, wherein in said step (g) regenerating said reaction zone with the designator (n-m) containing deactivated catalytic material comprises using at least two different regeneration gases, wherein said at least two different regeneration gases are dosed in a sequence.

11. The process according to claim 1, wherein the exothermic heat originating from regenerating a bed of catalytic material is used for preheating of the hydrocarbon feedstock containing LPG to the reaction zone designated as 1.

12. The process according to claim 1, wherein the LPG consists of one or more selected from the group consisting of ethane, propane and butane.

13. The process according to claim 5, wherein said total number of reaction zones is at least 6.

14. The process according to claim 13, wherein said total number of reaction zones not participating in the conversion process is at most 2.

15. The process according to claim 5, wherein said total number of reaction zones not participating in the conversion process, m, is at least 2.

16. The process according to claim 1, further comprising, after changing the value of the designator with the value of n to 1, preheating the hydrocarbon feedstock to the reaction zone designated as 1 using heat from at least one of the reaction zones with the designator larger than (n-m).

17. The process according to claim 1, wherein an outlet temperature of the reaction zone with the designator (n-m) is higher than an outlet temperature of the reaction zone with the designator (n-m-1).

18. The process according to claim 1, wherein the reaction zones not participating in the conversion process are in series with the reaction zones operated under reaction conditions sufficient to convert at least a portion of said LPG to an effluent having said higher hydrocarbon(s).

19. A process for converting LPG to higher hydrocarbon(s) including aromatic hydrocarbon(s) in n reaction zones operated in series, wherein m reaction zones are not participating in the conversion process and only (n-m) reaction zones are operated under reaction conditions sufficient to convert at least a portion of said LPG to an effluent having said higher hydrocarbon(s), wherein each reaction zone is initially numbered serially with a designator from 1 to n, wherein said total number of reaction zones, n, is at least 3, said total number of reaction zones not participating in the conversion process, m, is at least 1, and (n-m) is at least 2, the process comprising:

(a) providing a quantity of catalytic material within each reaction zone;

(b) providing to the reaction zone designated as 1 a hydrocarbon feedstock containing LPG;

(c) heating at least a portion of the effluent of each reaction zone with a designator equal to or smaller than (n-m-1) to the inlet temperature of the reaction zone with a designator larger by one than that of the reaction zone from which said effluent originates;

(d) transferring said at least a portion of effluent of each said reaction zone with a designator equal to or smaller than (n-m-1) to the reaction zone with a designator larger by one than that of the reaction zone from which said at least a portion of said effluent originates;

(e) maintaining each reaction zone with a designator equal to or smaller than (n-m) at an average bed temperature higher than or equal to an average temperature in the reaction zone with a designator smaller by one than that of said reaction zone, feeding the effluent from the reaction zone with the designator (n-m) to another process unit, and regenerating the reaction zones with a designator larger than (n-m), followed by (f) terminating transferring effluent from the reaction zone designated as 1 to the reaction zone designated as 2;

(g) starting regenerating the reaction zone designated as 1 containing deactivated catalytic material;

(h) decreasing the inlet temperature of each reaction zone with a designator larger than 1 and equal to or smaller than (n-m) to the former inlet temperature of the reaction zones with a designator smaller by one than that of said reaction zone, respectively;

(i) changing the value of each designator equal to and larger than 2 to a number smaller by one than its initial value, and changing the value of the designator with value 1 to n, (j) repeating steps (b) to (i).

20. The process according to claim 19, wherein
said total number of reaction zones, n, is at least 4; and
said total number of reaction zones not participating in the conversion process, m, is at least 2.

21. The process according to claim 19, further comprising, after changing the value of the designator with the value of n to 1, preheating the hydrocarbon feedstock to the reaction zone designated as 1 using heat from at least one of the reaction zones with the designator larger than (n-m).

* * * * *